UNITED STATES PATENT OFFICE.

PETER CLAUSSEN, OF GREAT CHARLOTTE STREET, BLACKFRIARS, ENGLAND.

IMPROVEMENT IN PROCESSES FOR TREATING VEGETABLE FIBER.

Specification forming part of Letters Patent No. 8,134, dated June 3, 1851.

*To all whom it may concern:*

Be it known that I, PETER CLAUSSEN, of Great Charlotte Street, Blackfriars, county of Surrey, England, a subject of the Emperor of Brazil, have invented or discovered new and useful Improvements in the Preparation of Fibrous Materials for Spinning and Felting; and I do hereby declare that the nature of the same is fully described in the annexed specification.

My improvements in the preparation of materials for spinning and felting have special relation to flax and hemp, and other plants to which the same may be applicable; and the processes I use to prepare the same, though possessed of some features common to the whole, vary according to the purposes to which the fiber obtained from the said materials is to be applied—that is to say, according as the fiber is required to be long or short, fine or coarse, and the machinery on which it is to be spun is adapted to the spinning of one or other sort of fiber.

By the term "fiber," as used throughout the specification, I mean that portion of each plant which is capable of being spun or felted, and my invention applies to the fiber surrounding the stems of dicotyledonous plants, and to that existing in the stems and leaves of monocotyledonous plants.

In the following exemplifications of my improved modes of preparation I shall throughout suppose flax or hemp to be the material operated upon.

If I have to deal with the plant from the time of its being first cut down or pulled for use, I take it in the state of straw (after the seed has been stripped from it) and subject it to the following, which I call my "primary process:" I first steep the straw in a solution of a caustic alkali of about 1° of Twaddle's hydrometer, and for such a length of time as may be most convenient. If dispatch is required, I use the solution in a boiling state, in which case an immersion of about six hours is sufficient. If more time can be conveniently allowed I employ a solution of a temperature of about 150° Fahrenheit and prolong the immersion for about twelve hours, and so in proportion to the degree of temperature. The solution may be even used at a lower temperature with a corresponding prolongation of time; but in no case need the immersion exceed a couple of days at the utmost.

The object of the preceding treatment is twofold: first, to decompose, dissolve, or remove (more or less, as required) the glutinous, gummy, or other matters which connect the fiber with the woody portions of the plant; and, second, to discharge or decompose any oleaginous, coloring, or extraneous matter contained in the straw, without allowing the matters so discharged to stain the fiber, and these results are obtained by the action of the alkaline solution.

In the preceding mode of preparing vegetable materials I generally use a solution of caustic soda; but other alkaline liquors will answer the purpose—such as a solution of caustic potash or lime dissolved or diffused in water—or, indeed, any substance having the like power of removing, discharging, or decomposing the coloring, glutinous, gummy, or other foreign matters contained in the straw, and which would interfere with the whiteness of the fiber, or with its ready separation and manufacture.

If the fiber is required to be long, like that commonly spun in flax machinery, I subject the straw to a second process for the purpose of getting rid of any of the alkali still adhering to the straw or fiber, and for the purpose of completing, if necessary, the removal of any glutinous, gummy, coloring, or extraneous matters. To this end I take the straw from the alkaline solution and steep it for about two hours in water acidulated by sulphuric acid in the proportion of about one part of the acid to from two to five hundred parts of water. Some other dilute acids will also answer this purpose, such as dilute muriatic acid, &c.; but sulphuric acid is to be preferred; or I transfer the straw, while yet wet with the alkaline solution, to a suitable chamber or stove, where I subject it to the action of sulphurous acid, or the fumes produced by the slow combustion of sulphur. In both cases the acid combines with any free alkali remaining on the straw or fiber to form a sulphite or sulphate, according to the acid employed, while an excess of either sulphuric or of sulphurous acid will complete the decomposition, discharge, or removal of the glutinous, coloring, and other matters. I next remove the straw from the acid bath or sulphur chamber or stove, and wash or otherwise treat it with water till all soluble matters are removed.

If the fiber is required to be decolorized, the straw may now be bleached by a new process discovered by myself, or by any of the other known bleaching processes. It may then be dried, ready for breaking and scutching, by the means ordinarily followed in the manufacture of long flax.

I would mention here that in some cases it will be found advantageous to pass the straw between rollers, or to break it roughly or partially before subjecting it to the process above described, for the purpose of facilitating the action of the chemical agents upon it. By the aforesaid method I am enabled to remove from the straw certain matters which water alone cannot discharge. The fiber thus prepared is also freer to hackle and the straw more easy to scutch than fiber and straw treated in the ordinary way. Much time and much material are also saved, while the noxious exhalations attendant upon the water-rotting system are wholly prevented.

If the fiber is required to be short, so that it may be felted or carded and adapted for spinning on cotton, silk, worsted, or tow spinning machinery, either alone or in combination with cotton, wool, fur, hair, or silk, I take the fiber, after treating it by the processes just described, and divide it in proper lengths by some suitable instrument or machine. I then transfer the straw or fiber to a bath containing a strong solution of bicarbonate, sesquicarbonate, or even carbonate of soda, or any other similar compounds; but the first two of these are to be preferred as most abounding in carbonic acid. In this bath I allow it to remain for about three or four hours, during which time the fiber becomes well saturated with the salt. I then immerse the material impregnated with the solution of the carbonates before named for about a couple of hours in water acidulated by sulphuric acid of about the strength of one part of acid to two hundred parts of water; or, instead thereof, I expose the saturated materials, while wet, to the action of burning sulphur in a suitable chamber or stove. In this operation it appears that a certain portion of gas being developed in the fibrous tubes splits and divides them by its expansive power into filaments having the character and appearance of fine cotton-wool, in which state they may be died and manufactured, like cotton or wool. The same means of effecting the splitting of the fiber may of course be employed in the preparation of long fiber, and I do not limit myself to its use for the preparation of short fiber alone; but when the fiber is of its original length the solutions employed take a longer time to penetrate the interior.

The decomposition of the bicarbonate of soda or other suitable compound with which the fiber is saturated may be also effected by means of electric agency, when a like evolution of gas and splitting up of the fiber will take place. After the fiber has been subjected to the splitting process it must be carefully washed to remove all soluble matters and then dried.

The splitting process may be applied to the plant either in the straw (the wood of which is to be afterward removed by proper means and machinery) or in the state of long fiber, whether prepared by my before-described process or by any of the usual and known processes.

What I claim as my invention and discovery, and desire to secure by Letters Patent of the United States, is—

1. The preparation of vegetable fiber capable of being spun or felted by submitting the plant from which the fiber is to be derived to the action of caustic soda or other solution of like properties, and then to that of sulphuric or sulphurous acid in the manner set forth, whereby the gummy, glutinous, and other matters which connect the fiber with the woody portion of the plant are dissolved and discharged, and at the same time effecting the discharge of the oleaginous and other coloring-matters contained within the woody portions or straw without staining the fiber, as more fully described herein.

2. Splitting the fibers of vegetable matter, in preparing them for spinning, by the generation and liberation of carbonic acid or other gas within the cellular portions of said fibers, in the manner described, or in any other manner by which gas may be generated and liberated for the purpose set forth.

P. CLAUSSEN.

Witnesses:
  R. A. BROOMAH,
    *Patent Agent,* 166 *Fleet St., London.*
  ALFRED LONGSDON,
    166 *Fleet St.*